Feb. 21, 1939.  E. V. HALLSTEN  2,148,351
CENTRAL HEATING PLANT
Filed Sept. 22, 1936   3 Sheets-Sheet 1
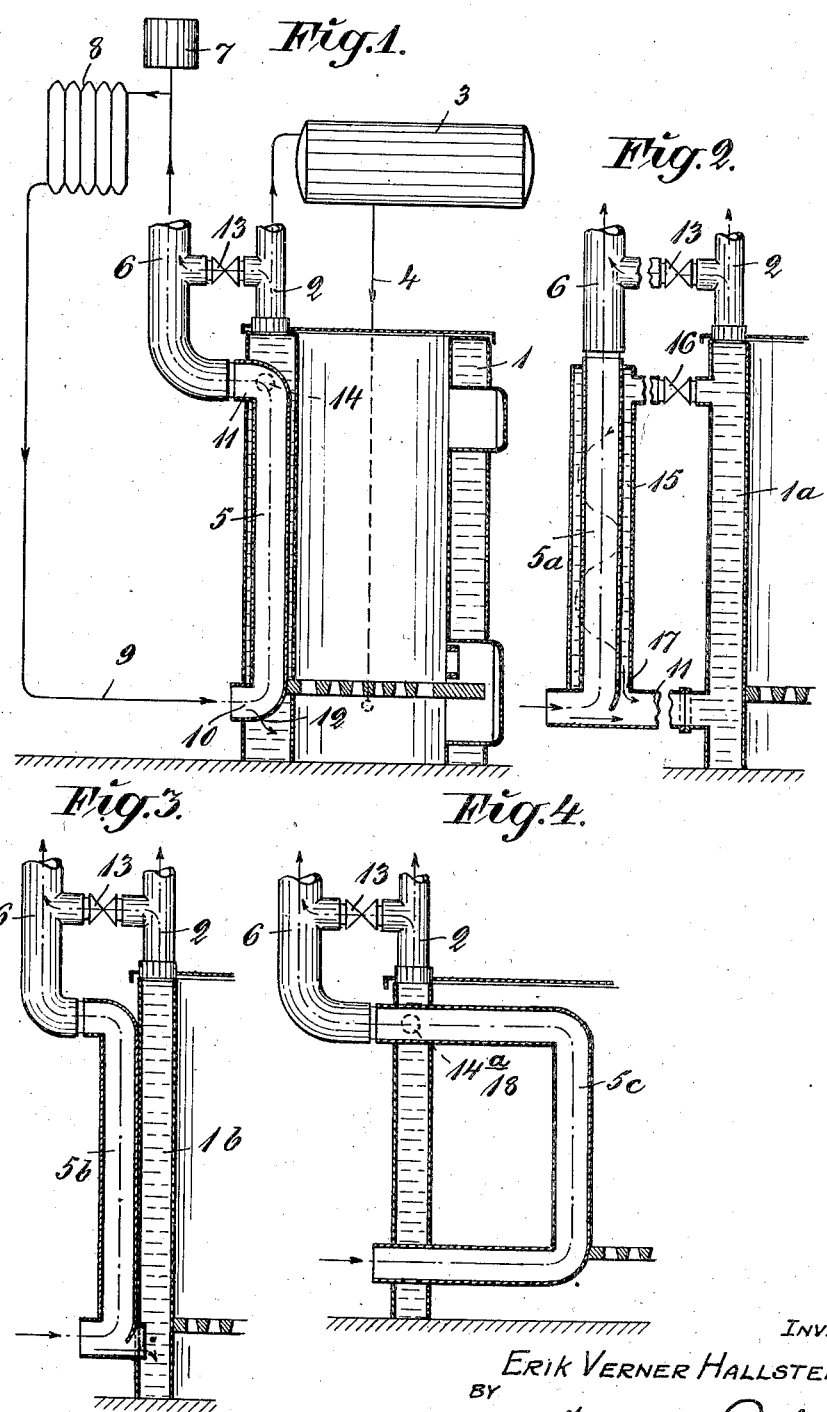

Feb. 21, 1939.  E. V. HALLSTEN  2,148,351
CENTRAL HEATING PLANT
Filed Sept. 22, 1936  3 Sheets-Sheet 2

INVENTOR
ERIK VERNER HALLSTEN,
BY
Henry C. Parker
ATTORNEY.

Feb. 21, 1939. E. V. HALLSTEN 2,148,351
CENTRAL HEATING PLANT
Filed Sept. 22, 1936   3 Sheets-Sheet 3

INVENTOR
Erik Verner Hallsten,
BY
Henry C. Parker
ATTORNEY.

Patented Feb. 21, 1939

2,148,351

UNITED STATES PATENT OFFICE 2,148,351

CENTRAL HEATING PLANT

Erik Verner Hallsten, Bergasvagen, Sweden

Application September 22, 1936, Serial No. 102,025
In Sweden October 16, 1935

12 Claims. (Cl. 237—19)

In central heating plants generally and in smaller plants of this kind particularly it is desirable to deliver, from one and the same boiler, water of two different temperatures, i. e. on the one hand, hot water of for instance 60 to 80 degrees centigrade for preparing secondary hot water for different purposes in the household, such as for the bathroom, cleansing, washing, etc., and, on the other, warm water for heating the radiators or other heating means, placed in the different rooms. The water for the radiators should have an excess temperature ranging between, for instance, 8 and 50 degrees centigrade, according to the weather, the higher temperatures being required only during very cold weather and thus comparatively infrequently. During the greater portion of the heating season the excess temperature of the radiator water should be very low and should differ considerably from the temperature of the supply water which latter should be constant throughout the year independent of the weather.

It has been previously proposed for this purpose to maintain the water space of the boiler at a high temperature suitable for the hot water supply and to circulate the boiler water directly through an apparatus adapted to transfer the heat of this water to a secondary water supply, the radiators being fed with water of reduced temperature obtained by mixing the return water from the radiators with hot water from the boiler. It is also known to conduct the return water through a shunt line included between riser and return lines of the radiator system and to deviate hot water from the boiler to the riser line through a regulating valve of special design.

The flow of the return water through the shunt line has then been controlled by a choke valve provided in the shunt line at the junction between this and the return line. The action of this valve has been assisted by the injector action occurring at the inlet of boiler water in the riser. It has also been proposed to let this injector action alone govern the flow. As the water in the shunt line is colder and heavier than the hot water in the boiler and the return water it has a tendency to stratify and not participate in the water circulation which means that the shunt line is idle. This disadvantage is particularly felt at low temperatures, such as when the firing is started or during a temporary reduction in the intensity of firing. The return water flowing back to the boiler will further cause a certain injector action on the water in the shunt line in a direction opposite to that of the hot water. The known devices operate accordingly not quite satisfactorily and require high plant costs on account of their complicated valve constructions.

The present invention has eliminated the disadvantages described and consists substantially in a heating plant wherein the radiator circulation plant communicates with the hot water supply plant through passage-ways disposed at the upper and lower ends of the shunt line and leading to the water space of the boiler, of which ways the one and preferably the upper one has an adjustable choke valve whereas for the rest the water spaces of the two plants preferably are entirely separate, and wherein the cross-section of the shunt line is substantially equal to that of the radiator riser, the shunt line between the two passage-ways being in thermal communication with the boiler corresponding to the minimum heat requirements of the radiators and sufficient to cause a thermosiphonic action in the radiator plant independent of the choke valve.

Hereby the shunt line may be kept permanently entirely open or unrestricted and the only valve required is a simple slide valve at the inlet of the hot water into the radiator riser. The passage-way between the lower end of the shunt line and the boiler is preferably permanently open. The device functions thereby automatically once the valve has been set for a given temperature and the boiler is properly fired.

The invention will now be described more in detail with reference to the accompanying drawings, in which Fig. 1 illustrates diagrammatically a heating plant showing a boiler in vertical section according to the invention, whereas Figs. 2, 3, and 4 illustrate three different modifications thereof.

Figure 5:
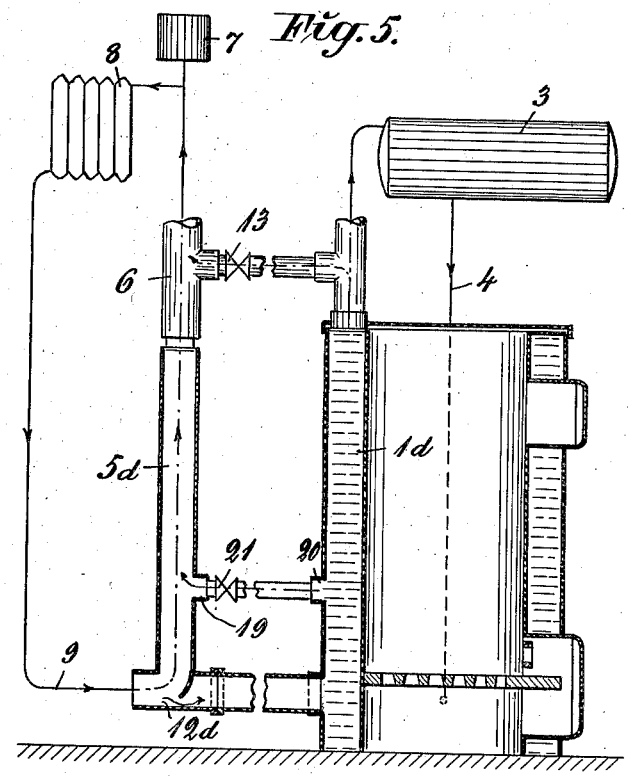
Figure 5 is a heating plant in vertical section and Figure 6 is a modification thereof.

In the embodiment shown in Fig. 1 the hot water section of the heating plant comprises the water space 1 of the boiler, a riser 2, by way of example a hot water apparatus 3, and a return line 4 to the lower portion of the water space 1. The radiator section comprises a shunt line 5, a riser 6, an expansion vessel 7, a number of radiators or the like 8, and a return line 9. The shunt line 5 extends through the water space 1 of the boiler and is vertical along a certain portion of the boiler height. This line is tubular and has substantially the same cross-section as the radiator riser 6. The line 5 is provided at its lower end with an inlet 10, attached to the radiator return line 9, and at its upper end with an outlet 11 attached to the radiator riser 6. A permanently open passage-way 12 leading to the water space 1 of the boiler affords, inter alia, the advantage that only one expansion vessel 7 is required in common with the radiator system 5 to 9 and the supply water system 1 to 4, since an excess pressure developed in, for instance, the boiler will immediately be transmitted through the passage-way 12 to the radiator system and vice versa.

From the hot water line 2 leading to the hot water tank 3 is a line branched-off to the radiator riser 6 which branch-line is controlled by a slide valve 13 or the like which serves as a mixing valve.

In the modification shown in Fig. 2 the shunt line 5a is disposed inside a special hot water jacket 15 which communicates with the water space 1a of the boiler and preferably at its upper portion through a valve-controlled line 16 and at its lower portion through the permanently open outlet 17.

In the embodiment shown in Fig. 3 the shunt line 5b is disposed in thermal contact with the outer wall of the water space 1b. According to the embodiment shown in Fig. 4 the shunt line 5c is provided inside the fire space 18. Otherwise the embodiments of Figs. 3 and 4 agree with those previously described.

The mixing valve 13 can be closed, if desired, the required mixing being accomplished by valve 14 which is disposed in the upper portion of the shunt line which is inside the water space of the boiler, as shown in Figs. 1 and 4. Valve 14 may be entirely inside the boiler.

The shunt line may also be made in the form of a coil provided inside or outside the boiler and may, if desired, be designed as a portion of the boiler proper.

In the embodiments according to Figs. 1, 3, and 4 the heating surface of the shunt line should be so dimensioned that the water in this line does not reach a higher temperature than the minimum temperature to be used in the radiators.

In the embodiment according to Fig. 2 the amount of heat transmitted to the water column of the shunt line can be regulated whereby a regulating range of considerable amplitude is obtained.

In the shown embodiments the water passing through the shunt line is not obstructed in any way. Quite independent of the addition of hot water through the valve 13 the circulation through the shunt line is maintained on account of the thermosiphonal action caused by the heat transfer through the walls of the shunt line. As has been stated above the heating of the shunt line is comparatively small so that in most cases a smaller or greater quantity of hot water must be supplied through the valve 13 to obtain the desired radiator temperature whereby a wide range of regulation is provided.

Each radiator in, for instance, a living house may thus be brought to operate with its entire radiating surface at the lowest possible temperature consistent with the temporary heating requirements.

As the device according to Fig. 2 is not dependent upon the design of the boiler proper it can be placed in any suitable place within the building provided the necessary hot water and return lines are available. This is particularly advantageous when it is desired to heat a special group of radiators or a single radiator.

It is also possible to heat the shunt line through direct injection of hot water. In the embodiment illustrated in Fig. 5 the shunt line 5d is provided with an additional inlet 19 communicating with the water spaced 1d of the boiler, said inlet being disposed at a level between the passage-ways 12d and 13. This inlet is included in a connection between the lower portion of the shunt line and the water space 1d of the boiler at 20 on approximately the same level. The line 19, 20 is also provided with a regulating valve 21. The temperature of the water at the point 20 is generally considerably lower than that in the upper portion of the boiler. In any case the quantity of hot water flowing through the pipe 20, 19 can be regulated by the valve 21 in such a manner that the water column in the shunt line 5d is heated only to a degree corresponding to the minimum heat requirement of the radiators but in any case to the extent that a thermosiphonal action is caused in the radiator system 5d, 6, 8, 9. The ratio between the liquid quantities flowing through the valves 13 and 21 can be controlled through the setting of the valves.

Figure 6:
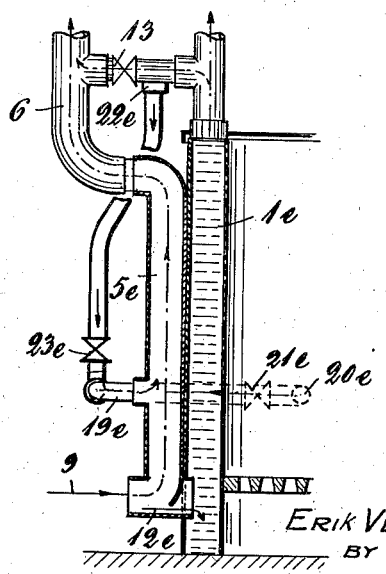

If the shunt line is disposed in heat conducting communication with the boiler, by way of example according to Fig. 6, it is conceivable that the heat transmission obtained thereby is insufficient in which case an additional hot water inlet can be provided according to the embodiment of this figure. In this embodiment the shunt line 5e is in heat conducting contact with the outer wall of the boiler 1e. An additional hot water inlet is disposed at a point 19e and communicates through a line having a valve 21e with a point 20e in the water space of the boiler at approximately the same level as the point 19e. An additional outlet from the boiler is shown at 22e which connects with the point 19e by means of the vertical pipe and valve 23e. If it is desired to extract water from the boiler from the point 22e, the valve 23e is open and valve 21e is closed but, if it is desired to extract water from the point 20e, valve 21e is open and valve 23e is closed.

By setting the valves 21e and/or 23e it is possible to control the amount of heat supplied to the shunt line 5e, with the inclusion of that conducted directly through the pipe wall, in such manner that it does not exceed the minimum heat requirement of the radiators in the closed position of the valve 13 but, at the same time, it is sufficient to guarantee the necessary thermo-siphonal action in the radiator system.

Figure 7:
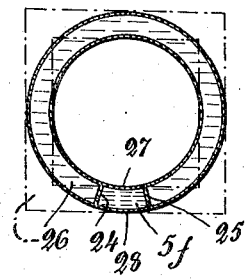
Figs. 7 to 9 show three different embodiments of a boiler in horizontal section.
Figure 8:
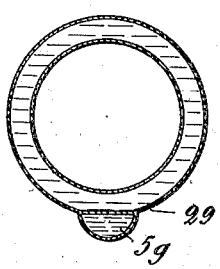
Figure 9:
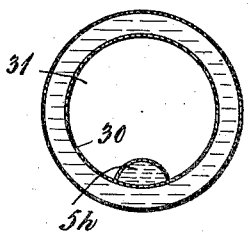
Figure 10:
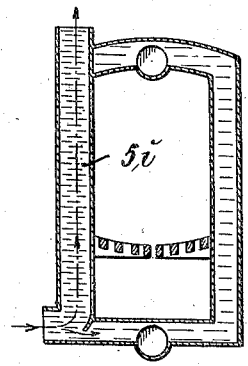
Figs. 10 and 11 show two different embodiments of a boiler of sectional type shown in vertical section.
Figure 11:
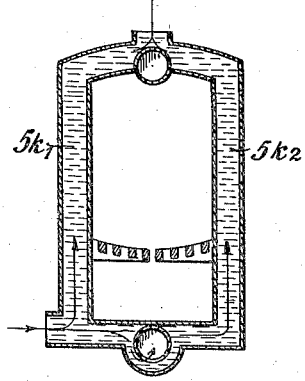

In boilers of cast iron the water space is generally designed as a water jacket of one or more sections surrounding the fire box, compare Figs. 7 to 11. The shunt lines 5f, 5g, 5h, 5i, and 5k₁, 5k₂ can then also be made of cast iron and may consist of a preferably vertical conduit formed integrally with the walls of the water jacket or section respectively. In boilers cast in one piece the conduit walls can consist of vertical partitions extending across the water space 26 of the jacket, as shown in Fig. 7, in which case, on its two opposite sides 24, 25, the substantially rectangular shunt line 5f is in contact with the water in the water space of the boiler, while on one side 27 it faces the fire box, and on the remaining side 28 it faces the atmosphere. The conduit can also be formed as an expanded portion 5g, 5h, as shown in Figs. 8 and 9, preferably of semi-circular cross-section, on the outside or inside of the outer wall 29 or on the outside or inside of the inner wall 30 of the water jacket. In the first instance, as shown in Fig. 8, the shunt line faces on its outside the atmosphere and on its inside the water space and in the second instance, as shown in Fig. 9, on its outside it faces the water space and on its inside the fire space 31. In boilers of the sectional type the shunt line can be designed as a conduit 5i, as shown in Fig. 10, or parallel conduits can be used as shown at $5k_1$, $5k_2$, in Fig. 11, in one of the boiler sections.

Figure 12:
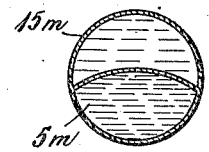
Figs. 12 and 13 are modifications of a detail in Figure 2, shown in horizontal section.
Figure 13:
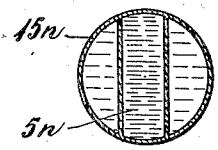

In similar manner the shunt lines 5m, 5n, of Figs. 12 and 13, may be made integrally with the wall of a circulation device 15m, 15n, compare Fig. 2. The walls of the shunt line 5m, 5n may be in contact partially with the water space in the circulation device and partially on one or more sides with the atmosphere.

Figure 14:
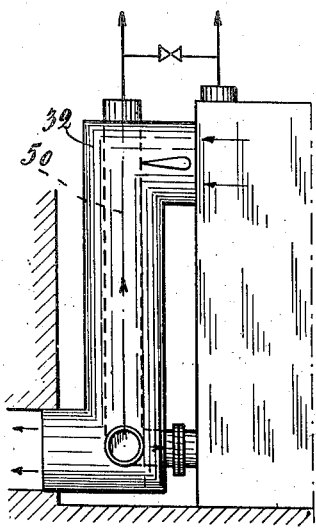
Figs. 14 and 15 are modified arrangements shown in elevation.

In the embodiment shown in Fig. 14 the shunt line 50 is disposed inside the smoke stack.

Figure 15:
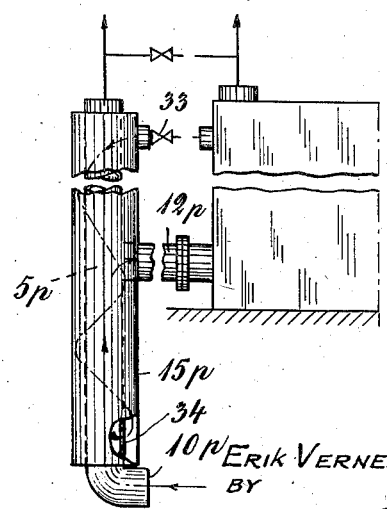

The embodiment shown in Fig. 15 is particularly intended for radiator plants extending only through a single story in which case the boiler is on level with the radiators or the like. Also in this case the radiators may be advantageously placed underneath the windows.

The inlet 10p of the shunt line is for this purpose disposed on a lower level than the boiler to facilitate the extension of the return-lines to the shunt-line through or underneath the floor. The shunt-line is surrounded by a water jacket 15p which communicates with the boiler through a valve 33 and with a lower extension of the shunt-line through an aperture 34. The lower liquid communication with the boiler is here constituted by the pipe 12p.

Similar arrangements may be made also in the embodiments according to Figs. 5 and 6.

It is to be understood that preferred embodiments of the invention have been disclosed herein for purposes of illustration only and that various changes, substitutions, and modifications may be made and will be apparent to a person skilled in the art. The invention is only to be limited in accordance with the following claims but interpreted in view of the prior art.

What is claimed is:

1. In combination, a hot water supply system and a water heating system normally operating at a temperature below that of said supply system, a water boiler heated by a source of heat, a riser connected with said boiler water for supplying heat to said supply system at substantially the maximum temperature of said boiler, a shunt line in series with and comprising part of said water heating system in contact with said boiler water along a rising section of length sufficient to produce a thermosiphonic action in said heating system and to supply substantially the heating demand of said heating system at its lowest temperature of operation, said shunt line being in direct communication with said boiler water at at least two vertically spaced points and valve means positioned in one of the two points of communication between the boiler and the shunt line adapted to limit the flow of water from said boiler into said shunt line substantially in accordance with the demands of said heating system.

2. In combination, a hot water supply system and a water heating system normally operating at a temperature below that of said supply system, a water boiler heated by a source of heat, a riser connected with said boiler water for supplying heat to said supply system at substantially the maximum temperature of said boiler, a shunt line in series with and comprising part of said water heating system in contact with said boiler water along a rising section of length sufficient to produce a thermosiphonic action in said heating system and to supply substantially the minimum heating demand of said heating system, said shunt line being in direct communication with said boiler water through at least two vertically spaced passageways, at least one of said passageways being controlled by a valve adapted to limit the flow of water from said boiler into said shunt line in accordance with the demands of said heating system.

3. The apparatus of claim 2 wherein the lower passageway between the boiler water and the shunt line is permanently open and the upper passageway is valve controlled.

4. In combination, a hot water supply system and a water heating system normally operating at a temperature below that of said supply system, a water boiler heated by a source of heat, the boiler water being the sole source of heat supply to said supply system and to said heating system, means for supplying heat to said supply system at substantially maximum boiler temperatures, a shunt line forming part of said heating system in heat transfer relationship with said boiler water along a rising section having a heat transfer area sufficient to produce a thermosiphonic action in said heating system and to supply substantially the minimum demands of said system, and valve controlled passageways connecting said boiler water with said heating system for limiting the flow of water from said boiler to said heating system in accordance with the demands of said system.

5. In combination, a hot water supply system and a water heating system normally operating at a temperature below that of said supply system, a water boiler having a water space heated by a source of heat, means for transferring heat from said water space directly to said supply system at substantially maximum boiler temperatures, a rising, jacketed shunt line comprising part of said heating system, said jacket being in communication with the boiler water, the area of said shunt line exposed to said boiler water being sufficient to produce a thermosiphonic action in said heating system and to supply substantially the minimum heating demands of said system, at least two passageways connecting said shunt line with said boiler water, at least one of said passageways being provided with a valve adapted to control the flow of said boiler water into said shunt line in accordance with the heating demands of said heating system.

6. In combination, a hot water supply system and a water heating system normally operating at a temperature below that of said supply system, a water boiler having a water space heated by a source of heat, means for transferring heat from said water space directly to said supply system at substantially maximum boiler temperatures, a shunt line in direct contact with the wall of said boiler along a rising section having a contact area sufficient to produce a thermosiphonic action in said heating system and to supply substantially the minimum heating demands of said system, at least two passageways connecting said shunt line with said boiler water, at least one of said passageways being provided with a valve adapted to control the flow of said boiler water into said shunt line in accordance with the heating demand of said heating system.

7. In combination, a boiler furnace heated by a source of heat, a hot water supply system and a water heating system normally operating at a temperature below that of said supply system, the boiler furnace being the source of heat supply to said supply system and to said heating system, means for transferring heat from said boiler furnace to said supply system at substantially maximum boiler temperatures, means in heat transfer relation with said boiler furnace for transferring heat from said boiler furnace to said heating system so constructed and arranged as to enable said heating system to be kept at temperatures substantially below maximum boiler temperatures during periods of minimum demands on said heating system, and at least two passageways leading from the boiler to said heating system spaced vertically a sufficient distance apart to produce a thermosiphonic circulation of water between said boiler and said heating system, at least one of said passageways being provided with a valve adapted to control the flow of said boiler water into said heating system to supply the more-than-minimum demands of said system; the said passageways and the said heat transferring means being so constructed and arranged that the temperature of the heating system can approach that of the supply system during periods of maximum demand on said heating system.

8. The apparatus of claim 7 wherein said means for transferring heat to said heating system to supply the minimum demands thereof comprises a shunt line in series with said heating system and having a rising section in contact with said source of heat of length sufficient to produce a thermosiphonic circulation of water in said heating system.

9. The apparatus of claim 7 wherein said means for transferring heat to said heating system comprises a shunt line included in said heating system between said passageways, and a further passageway leading from the boiler water to said heating system adapted to introduce sufficient boiler water into said heating system to supply the minimum demands of said system.

10. In combination, a hot water supply system and a water heating system normally operating at a temperature below that of said supply system, a water boiler having a water space heated by a source of heat, means for transferring heat from said water space to said supply system at substantially maximum boiler temperatures, a shunt line comprising part of said heating system so constructed and arranged as to absorb heat from said source of heat, the area of heat transfer between said shunt line and said source of heat being substantially less than the area of heat transfer between said boiler water space and said source of heat; said shunt line and said boiler water space being in communication at at least two points spaced vertically a sufficient distance apart to produce a thermosiphonic circulation of water between said water space and said heating system, at least one of said points of communication being provided with a valve for controlling the passage of boiler water into said shunt line in accordance with the heating demands of said heating system.

11. In combination, a hot water supply system and a water heating system normally operating at a temperature below that of said supply system, a water boiler having a water space heated by a source of heat, means for transferring heat from said water space to said supply system at substantially maximum boiler temperatures, a shunt line being part of said heating system also having a water space in direct heat conducting relationship with said source of heat for transferring heat from said source of heat to said heating system, the heated water space of said shunt line being substantially smaller than that of said boiler; said shunt line being in communication with said boiler water at at least two points spaced a sufficient vertical distance apart to produce a thermosiphonic circulation of water between said boiler water space and said shunt line; at least one of said points of communication being provided with a valve for limiting the passage of boiler water into said shunt line in accordance with the heating demands of said heating system.

12. In combination, a hot water supply system and a water heating system normally operating at a temperature below that of said supply system, a water boiler having a water space with a heating surface heated by a source of heat, means for transferring heat from said water space to said supply system at substantially maximum boiler temperatures, a shunt line passing through and being surrounded by said water space and comprising part of said heating system for transferring heat from said water space to said heating system, the contact area of said shunt line with said water space being substantially smaller than the heating surface of said water space; said shunt line being in communication with said boiler water at at least two points spaced a sufficient vertical distance apart to produce a thermosiphonic circulation of water between said boiler water space and said shunt line; at least one of said points of communication being provided with a valve for controlling the passage of boiler water into said shunt line in accordance with the heating demands of said heating system.

ERIK VERNER HALLSTEN.